United States Patent

Sexton et al.

[11] Patent Number: 5,818,887
[45] Date of Patent: Oct. 6, 1998

[54] METHOD FOR RECEIVING A SIGNAL IN A DIGITAL RADIO FREQUENCY COMMUNICATION SYSTEM

[75] Inventors: Thomas A. Sexton, Schaumburg; Fuyun Ling, Hoffman Estates; Kenneth A. Stewart, Chicago, all of Ill.

[73] Assignee: Motorola, Inc., Schaumburg, Ill.

[21] Appl. No.: 687,882

[22] Filed: Jul. 26, 1996

[51] Int. Cl.$^6$ .................................................. H04L 7/00
[52] U.S. Cl. .......................................... 375/355; 370/503
[58] Field of Search ................................. 375/278, 285, 375/262, 341, 346, 349, 357, 229, 355, 362, 365, 371; 370/507, 516, 508, 509, 517; 329/318, 349, 353

[56] References Cited

U.S. PATENT DOCUMENTS

| | | | |
|---|---|---|---|
| 4,805,191 | 2/1989 | Burch et al. | |
| 5,204,874 | 4/1993 | Falconer et al. | |
| 5,463,657 | 10/1995 | Rice | 375/200 |
| 5,576,715 | 11/1996 | Litton et al. | 342/357 |
| 5,608,722 | 3/1997 | Miller | 370/320 |
| 5,640,416 | 6/1997 | Chalmers | 375/200 |
| 5,654,979 | 8/1997 | Levin et al. | 375/206 |

OTHER PUBLICATIONS

J. Holmes, Coherent Spread Spectrum Systems, Robert E. Krieger Publishing Co., pp. 467–486 (1990).

J. Proakis, "Digital Communications", McGraw–Hill, New York, Chapter 6, Section 7 (1983).

A. Viterbi, "CDMA Principles of Spread Spectrum Communication", Addison–Wesley Publishing Co., sec. 3.5 (1995).

R. Walton and M. Wallace, "Near Maximum Likelihood Demoduation for M–ary Orthogonal Signalling", IEEE VTC pp. 5–8 (1993).

Primary Examiner—Wellington Chin
Assistant Examiner—Jean B. Corrielus
Attorney, Agent, or Firm—Heather L. Creps

[57] ABSTRACT

The method includes acquiring a signal (501); inputting (502), at a first time, a received symbol to a demodulator having a plurality of outputs to produce a set of early outputs; inputting (504), at a second time, the received symbol to the demodulator to produce a set of on-time outputs; inputting (505), at a third time, the received symbol to the demodulator to produce a set of late outputs; and comparing (506) at least one output in the set of early outputs with at least one output in the set of late outputs to produce a timing measure.

7 Claims, 4 Drawing Sheets

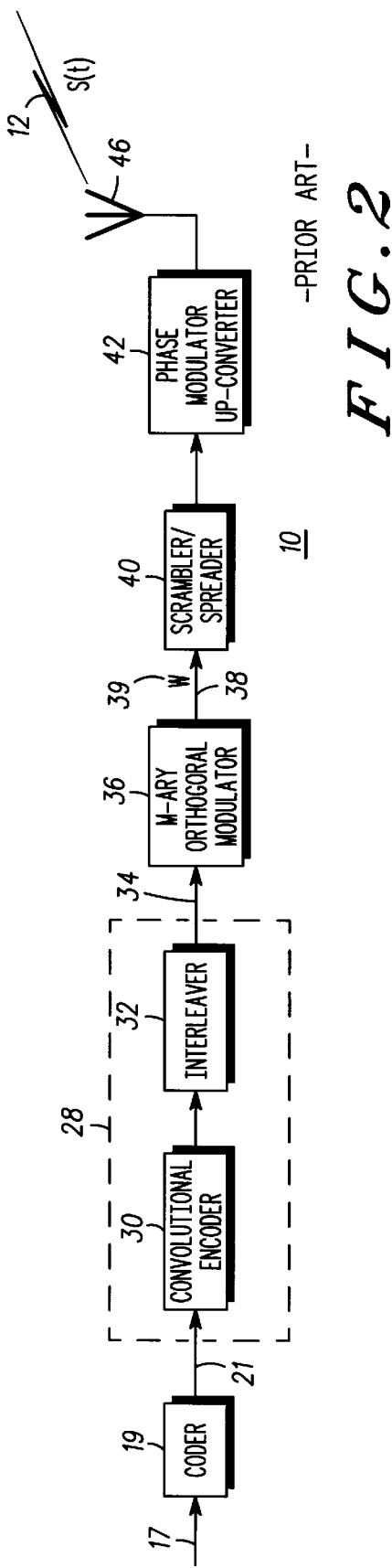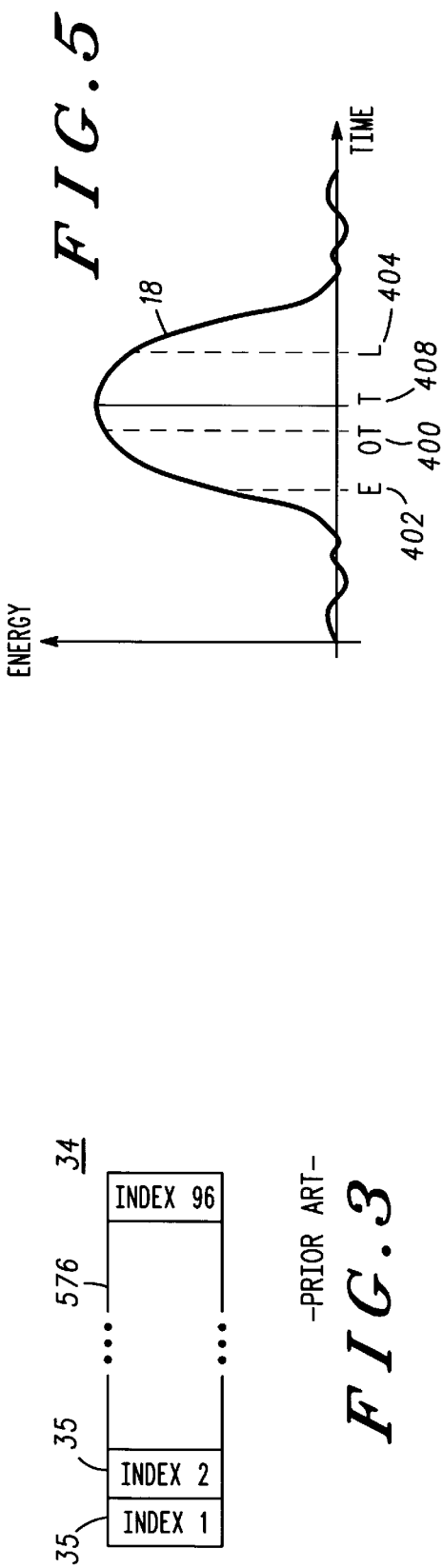

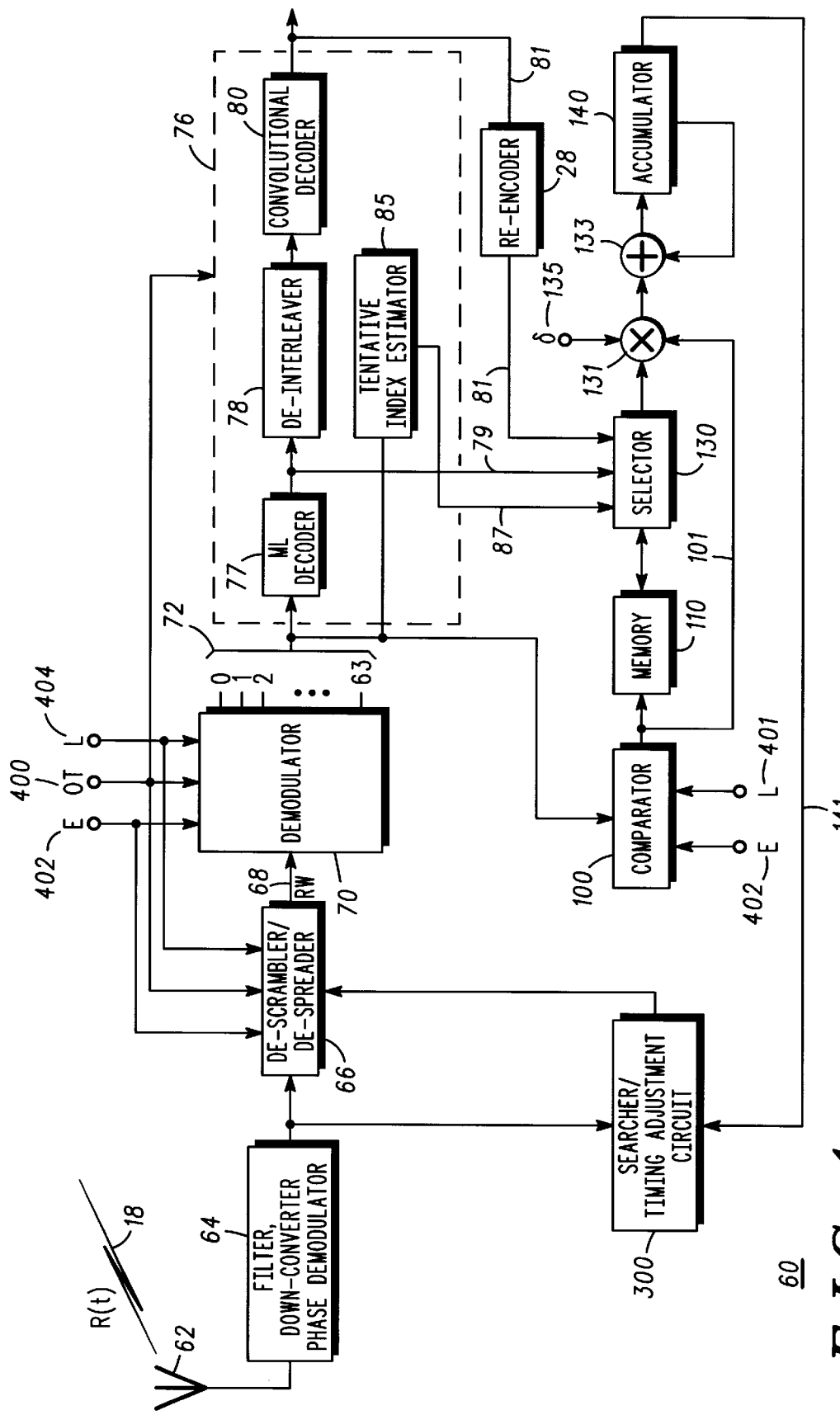

METHOD FOR RECEIVING A SIGNAL IN A DIGITAL RADIO FREQUENCY COMMUNICATION SYSTEM

FIELD OF THE INVENTION

This invention relates generally to wireless communication systems, and, more particularly, to a method and apparatus for receiving a signal in a digital radio frequency communication system.

BACKGROUND OF THE INVENTION

In a typical wireless communication system such as a digital radio frequency (RF) radiotelephone system, a base station having a controller and a plurality of transmitters and receivers communicates via an RF channel with a mobile station operating within an area served by the base station.

Transmitting a communication signal over an RF channel through a medium such as air causes a received communication signal to significantly differ from the originally transmitted communication signal. For example, the transmitted communication signal may be altered by slowly-changing channel parameters such as channel gain, phase shift and time delay, and may further be corrupted by an amount of noise. To produce an accurate estimate of the originally transmitted signal, it is important for a receiver, particularly a non-coherent receiver, to maintain accurate timing during recovery of the communication signal.

There is therefore a need for a method and apparatus for receiving a signal in a digital radio frequency communication system which accurately adjusts the timing during recovery of the signal.

SUMMARY OF THE INVENTION

According to a further aspect of the present invention, a method for receiving a signal in a digital radio frequency communication system, the signal comprising a plurality of received symbols associated with a plurality of transmitted symbols, includes inputting, at a first time, a received symbol of the plurality of received symbols associated with a transmitted symbol of the plurality of transmitted symbols to a demodulator having a plurality of outputs to produce a set of early outputs; inputting, at a second time, the received symbol to the demodulator to produce a set of on-time outputs; inputting, at a third time, the received symbol to the demodulator to produce a set of late outputs; comparing a predetermined number of outputs in the set of early outputs with a predetermined number of outputs in the set of late outputs to produce a set of timing measures; storing the set of timing measures in a memory; inputting a predetermined number of outputs in the set of on-time outputs to an estimator, the estimator outputting an estimate of the transmitted symbol; based on the estimate of the transmitted symbol, selecting a timing measure from the set of timing measures in the memory; and based on the selection, adjusting a time for receiving the signal.

Advantages of the present invention will become readily apparent to those skilled in the art from the following description of the preferred embodiment of the invention which has been shown and described by way of illustration. As will be realized, the invention is capable of other and different embodiments, and its details are capable of modifications in various respects. Accordingly, the drawings and description are to be regarded as illustrative in nature, and not as restrictive.

BRIEF DESCRIPTION OF THE DRAWINGS

FIG. 2 is a block diagram of a base station transmitter for generating a communication signal waveform.

FIG. 3 is a diagram of a digitally encoded and interleaved frame created by the transmitter of FIG. 2.

FIG. 4 is a partial block diagram of an apparatus for receiving the communication signal waveform generated by the transmitter depicted in FIG. 2, according to a preferred embodiment of the present invention.

FIG. 5 is a graph representing the received communication signal waveform at the ideal time of reception T.

DETAILED DESCRIPTION OF THE PREFERRED EMBODIMENTS

Figure 1:
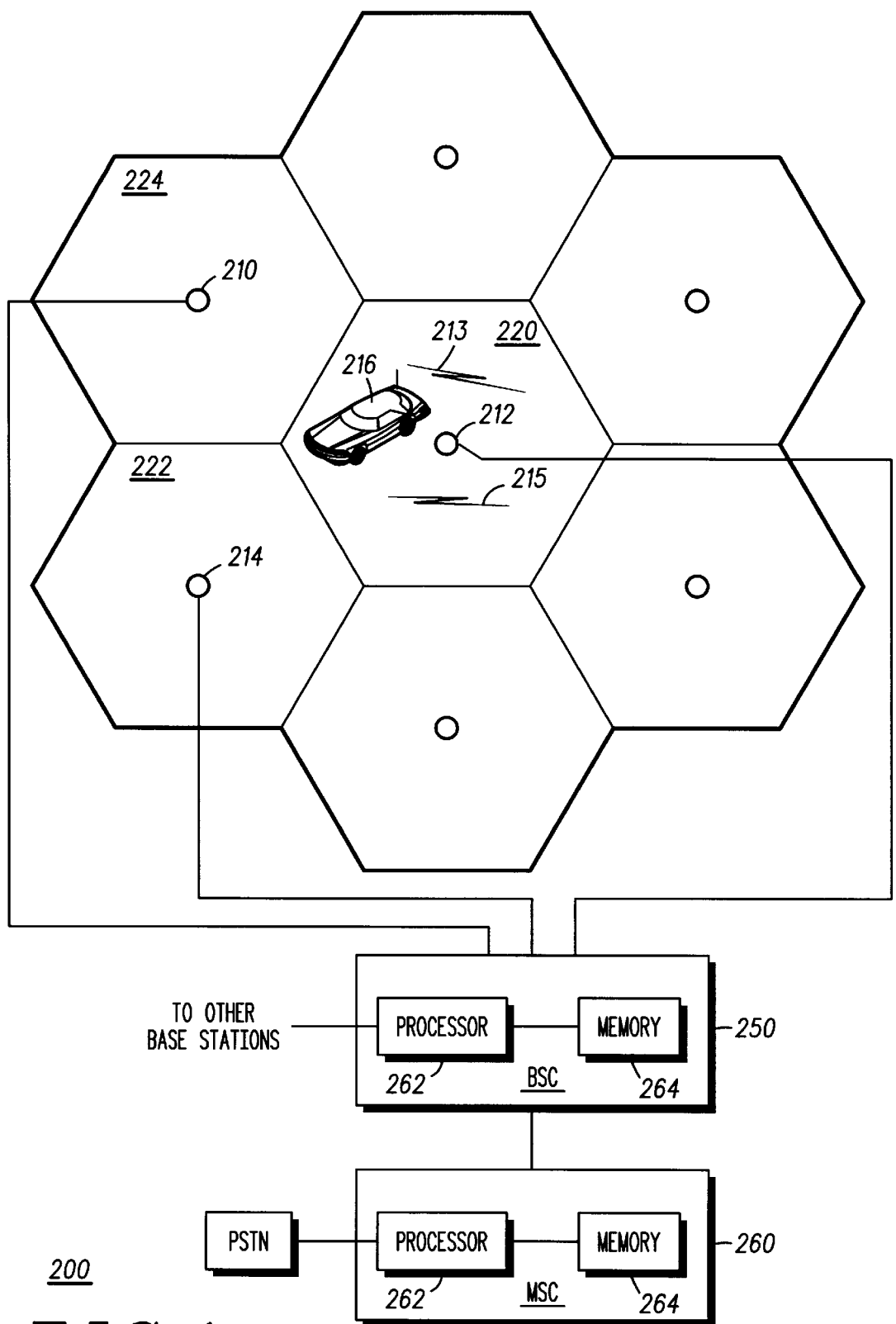
FIG. 1 is a block diagram of a typical wireless communication system.

Turning now to the drawings, wherein like numerals designate like components, FIG. 1 illustrates a wireless communication system 200, such as a code division multiple access (CDMA) digital radiotelephone system. Base stations 210, 212 and 214 communicate with a mobile station 216 operating within an area 220 served by base station 212. Areas 222 and 224 are served by base stations 214 and 210, respectively. Base stations 210, 212 and 214 are coupled to a base station controller 250, which includes, among other things, a processor 262 and a memory 264, and which is in turn coupled to a mobile switching center 260, also including a processor 262 and a memory 264.

Multiple access wireless communication between base stations 210, 212 and 214 and mobile station 216 occurs via radio frequency (RF) channels which provide physical paths over which digital communication signals such as voice, data and video are transmitted. Base-to-mobile station communications are said to occur on a forward-link channel, while mobile-to-base station communications are referred to as being on a reverse-link channel. A communication system using CDMA channelization is described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 [IS-95A], and "TIA Telecommunications Systems Bulletin: Support for 14.4 kbps Data Rate and PCS Interaction for Wideband Spread Spectrum Cellular Systems", February 1996 [the Bulletin], both IS-95A and the Bulletin incorporated herein by reference.

As shown in FIG. 1, communication signal 213 has been transmitted on an IS-95 forward-link channel such as a Paging Channel or a Traffic Channel by base station 212 to mobile station 216. Communication signal 215 has been transmitted via an IS-95 reverse-link channel such as an Access Channel or a Traffic Channel by mobile station 216 to base station 212.

FIG. 2 is a block diagram of a transmitter 10, for use in a mobile station such as mobile station 216, for generating communication signal 215. A data bit stream 17, which may be voice, video or another type of information, enters a variable-rate coder 19, which produces a signal 21 comprised of a series of transmit channel frames having varying transmit data rates. The transmit data rate of each frame depends on the characteristics of data bit stream 17.

Encoder block 28 includes a convolutional encoder 30 and an interleaver 32. At convolutional encoder 30, transmit channel frame may be encoded by a rate ⅓ encoder using well-known algorithms such as convolutional encoding algorithms which facilitate subsequent decoding of the frames. Interleaver 32 operates to shuffle the contents of the frames using commonly-known techniques such as block interleaving techniques.

As shown in FIG. 3, each frame 34 of digitally coded and interleaved bits includes ninety-six groups of six coded bits, for a total of 576 bits. Each group of six coded bits represents an index 35 to one of sixty-four symbols such as Walsh codes. A Walsh code corresponds to a single row or column of a sixty-four-by-sixty-four Hadamard matrix, a square matrix of bits with a dimension that is a power of two. Typically, the bits comprising a Walsh code are referred to as Walsh chips.

Referring again to FIG. 2, each of the ninety-six Walsh code indices 35 in frame 34 are input to an M-ary orthogonal modulator 36, which is preferably a sixty-four-ary orthogonal modulator. For each input Walsh code index 35, M-ary orthogonal modulator 36 generates at output 38 a corresponding sixty-four-bit Walsh code W 39. Thus, a series of ninety-six Walsh codes W 39 is generated for each frame 34 input to M-ary orthogonal modulator 36.

Scrambler/spreader block 40, among other things, applies a pseudorandom noise (PN) sequence to the series of Walsh codes W 39 using well-known scrambling techniques. At block 42, the scrambled series of Walsh codes W 39 is phase modulated using an offset quaternary phase-shift keying (OQPSK) modulation process or another modulation process, up-converted and transmitted as communication signal S(T) 12 from antenna 46.

FIG. 4 is a partial block diagram of an apparatus 60 within a base station such as base station 212 (shown in FIG. 1), for receiving communication signal R(T), originally transmitted by mobile station 216 as communication signal S(T) 12. Receiver 60 is preferably a RAKE receiver having a number of fingers, although only a single finger is shown. Receiver 60 may be coherent, non-coherent or quasi-coherent.

Antenna 62 receives communication signal R(T) 18, which comprises a number of received frames. Front-end processing such as filtering, frequency down-converting and phase demodulation of communication signal R(T) 18 is performed by well-known methods and circuits at block 64.

Searcher 300, the operation and construction of searchers being generally well-known, attempts to lock onto received signal R(T) 18 at approximately the time of reception of R(T) 18, looking for R(T) 18 at a plurality of time offsets. Once receiver 60 has locked onto signal R(T) 18 at the time offset which approximates the ideal time of reception of R(T) 18, referred to as on-time offset OT 400, receiver 60 may also monitor R(T) 18 at a time offset slightly earlier than OT 400, referred to as early offset E 402, and at a time offset slightly later than OT 400, known as late offset L 404. Early offset E 402 and late offset 404 are preferably approximately one Walsh chip period apart.

At each time offset 400, 402 and 404, de-scrambler/de-spreader block 66, among other things, removes the PN code applied by scrambler block 44 (shown in FIG. 2) to the series of Walsh codes W 39 (also shown in FIG. 2). In the IS-95 reverse-link channel, a received frame of received signal 18 includes ninety-six received symbols, or Walsh codes, which are each sixty-four bits long. The received Walsh codes have been altered during transmission by various channel parameters, however, and simply appear to receiver 60 to be received signal samples. Nevertheless, the received Walsh codes are referred to herein as received Walsh codes RW.

Referring again to FIG. 4, each received Walsh code RW 68, after leaving de-scrambler/de-spreader 66, is input to an orthogonal demodulator 70, such as a Fast Hadamard Transform (FHT). FHT 70 may be implemented using commercially available hardware as an array of adders or as a multiplexed adder, depending on its size. Alternatively, FHT 70 may be implemented utilizing a conventional digital signal processor (DSP) such as a Motorola DSP, part no. 56166 or an application specific integrated circuit (ASIC).

Upon receiving a received Walsh code RW 68, FHT 70 generates a number of output signals 72. Outputs 72 associated with the received Walsh code RW 68 input to FHT 70 at early offset time E 402 are referred to as the set of early outputs, outputs 72 produced by FHT 70 in response to the received Walsh code 68 at on-time offset time OT 400 are referred to as the set of on-time outputs, and outputs 72 associated with late offset time L 404 are referred to as the set of late outputs.

Sixty-four output signals 72 are generated by FHT 70 per Walsh code RW 68. Each output signal 72 has an index which references one of the sixty-four possible Walsh codes W 39 generated by M-ary orthogonal modulator 36 (shown in FIG. 2). Thus, in the IS-95 reverse link channel, when a received Walsh code group RW 68 is input to FHT 70, sixty-four output signals 72 which correlate to sixty-four possible transmitted Walsh codes 39 are produced. It should be understood that in addition to having an index, each output signal 72 also has an associated complex number (not shown). Seven bits are preferably allocated to the real and imaginary portions, respectively, of the complex number, although fewer or more bits are possible. For simplicity, the index and the complex number will be referred to collectively as output signal 72.

Each output signal 72 further has an associated energy value (not shown), commonly calculated by magnitude-squaring the complex number associated with output signal 72. The energy value generally corresponds to a measure of confidence, or a likelihood, that output signal 72 indexes a Walsh code W 39 which corresponds to a group of received Walsh codes RW 68 input to FHT 70. The energy value may have any suitable bit width, and may be, for example, fourteen bits wide.

Acting on the set of on-time outputs, decoder block 76, which may include a Maximum Likelihood decoder 77, a de-interleaver 78 and a convolutional decoder 80, further demodulates received signal R(T) 18, estimating transmitted signal 12, and outputting signal 81. After the demodulation process, re-encoder 28, which may be substantially similar to encoder 28 shown in FIG. 2, may re-create the transmitted digitally coded and interleaved bits, depicted in FIG. 3, which represent indices to Walsh codes 39. Elements of decoder block 76 may be implemented in a variety of ways. For example, Maximum Likelihood decoder 77, which estimates indices to Walsh codes 39, may be implemented in hardware or software according to well-known methods. Maximum Likelihood decoders are described in general in J. Proakis, "Digital Communications", McGraw-Hill, Chapter 6, Section 7 (1983), incorporated herein by reference, and a description of a Maximum Likelihood decoder for use in an IS-95A base station receiver may be found in R. Walton and M. Wallace, "Near Maximum Likelihood Demodulation for M-ary Orthogonal Signalling", IEEE VTC, pp. 5–8 (1993), also incorporated herein by reference.

In a first embodiment of the present invention, comparator 100 accepts the set of early outputs and the set of late outputs from FHT 70, calculating the difference between the energy value of at least one late output from the set of late outputs and the energy value of at least one early output from the set of early outputs. When only one output 72 is selected from both the set of early outputs and the set of late outputs, the selected output 72 is preferably the output 72 having an energy value representing the highest measure of confidence that selected output 72 indexes a Walsh code 39 which corresponds to the received Walsh code group RW 68 input to FHT 70. In general, the selected output 72 from the set of early outputs has a different index than the selected output 72 from the set of late outputs. The calculated difference between selected output 72 from the late output set and selected output 72 from the early output set exits comparator 100 at line 101. This calculated difference may be represented by any number of bits, but is preferably represented by a single bit associated with the sign of the difference, referred to as a timing measure.

After some additional processing at elements 131, 133 and 140 (discussed further below), the timing measure is input to searcher/timing adjustment circuit 300, which adjusts on-time offset OT 400 so that receiver 60 remains locked onto signal R(T) 18 at the time offset which approximates the ideal time of reception of R(T) 18 (also discussed further below).

In a second embodiment of the present invention, a memory 110, which may be a commercially available random-access memory, for example, may be positioned at a point within receiver 60 to store timing measures output from comparator 100 at line 101. A separate memory 110 is preferably provided for each diversity element within receiver 60.

Comparator 100 preferably calculates the difference between the energy values associated with each pair of corresponding indices in the set of late outputs and the set of early outputs, storing timing measures resulting from each of the sixty-four comparisons. Alternatively, memory 110 may store less than all of the sixty-four timing measures generated by comparator 100 per received Walsh code 68. For example, memory 110 may retain only a subset (for example, one or eight or sixteen) of the timing measures.

The timing measures may be represented by any number of bits, but are preferably represented by a single bit associated with a sign of the calculated difference. For a single power control group in the IS-95A reverse channel, which includes six received Walsh codes RW 68, memory 110 may be viewed as a matrix of timing measures having sixty-four rows and six columns. Memory 110, however may be smaller or larger, and may, for example, store timing measures for an entire IS-95A reverse-channel frame.

Selector 130 preferably receives demodulated signal 81 from decoder block 76, which may have been re-encoded at re-encoder block 28. Frame demodulation is likely performed for sixteen power control groups, so that signal 81 includes ninety-six re-encoded indices 35. For each of the ninety-six indices 35, selector 130 addresses the appropriate row and column in memory 110 to retrieve the associated timing measure, which may have been calculated prior to the availability of demodulated signal 81. After some additional processing at elements 131, 133 and 140 (discussed further below), the selected and retrieved timing measure is input to searcher/timing adjustment circuit 300.

In a first alternative associated with the second embodiment, Maximum Likelihood decoder 77 may be operated once per power control group (that is, for six consecutive on-time output sets) to produce one set of "winning" six indices at line 79. For each of the six indices, selector 130 may address the appropriate row and column in memory 110 to retrieve the associated timing measure.

In a second alternative associated with the second embodiment, Maximum Likelihood decoder 77 may be operated once per power control group to produce a number of likely sets of six indices at line 79. For each diversity element, such as a RAKE receiver finger, the selected sets of indices are combined, and an overall most likely set is produced. A channel correction may also be applied to the selected sets of indices prior to combining. A suitable method for channel correction is disclosed in U.S. Pat. No. 5,754,599, entitled "Method and Apparatus for Coherent Channel Estimation in a Communication System", assigned to the assignee of the present invention and incorporated herein by reference. The resulting set of indices set has the highest likelihood of representing the transmitted indices, and is used to address the appropriate rows and columns in memory 110 to retrieve the associated timing measures.

In a third alternative associated with the second embodiment, a set of on-time outputs may be input to tentative index estimator box 85, which combines the on-time energy values of corresponding indices from each diversity element in receiver 60 and outputs the index having the maximum combined energy value at line 87. Selector 130 may utilize the output at line 87 to address memory 110 to retrieve the associated timing measure.

The timing measure(s) output from selector 130 or comparator 100 indicate whether on-time offset 400 should be delayed or advanced by searcher/timing adjustment circuit 300. FIG. 5 illustrates an ideal time T 408 for receiving a single pulse of R(T) 18. It can be seen that to approximate ideal time of reception T 408, on-time offset OT 400 should be delayed. In this case, the energy of R(T) at late offset 404 (that is, output 72 from the late output set) will be greater than the energy of R(T) at early offset 402 (that is, output 72 from the early output set), and the difference, on average, will be positive. The timing measure will reflect the positive sign of the difference, indicating that on-time offset OT 400 is earlier than ideal time of reception T 408, and should be delayed.

If, on the other hand, on-time offset OT 400 should be advanced to approximate T 408, the energy of R(T) at late offset 404 will be less than the energy of R(T) at early offset 402, and the difference, on average, will be negative. The timing measure will reflect the sign of the difference, indicating that on-time offset OT 400 is later than ideal time of reception T 408, and should be advanced.

If on-time offset OT 400 is correct, the difference between the energy of R(T) at late offset 404 and at early offset 402 will, on average, be zero. The timing measure will be zero, indicating that on-time offset OT 400 should not be changed.

Referring again to FIG. 4, the timing measures retrieved from memory 110 by selector 130, as well as timing measures 101, which are both preferably one bit wide, may be scaled at circuit 131 by a programmable loop gain $\partial$ 135, and the resulting product may be summed at circuit 133 with the contents of a timing measure accumulator 140. When accumulator 140 reaches a predetermined positive or negative threshold, a timing adjustment command may be issued to searcher/timing adjustment circuit 300 via line 141.

One suitable value of $\partial$ is three, although the value of $\partial$ may be programmable to any other suitable value, for example, a value between one and eight. The signal output from circuit 131 has a bit width equal to the bit width of $\partial$, which is preferably at least three bits wide. The bit width at accumulator 140 is preferably programmable, for example, to three, four or five bits. In addition, fractional loop gains may be obtained from the integer loop gains by periodically switching between gain values. Likewise, ∂ may have an initial value upon start-up and a different, steady-state gain thereafter.

Figure 6:
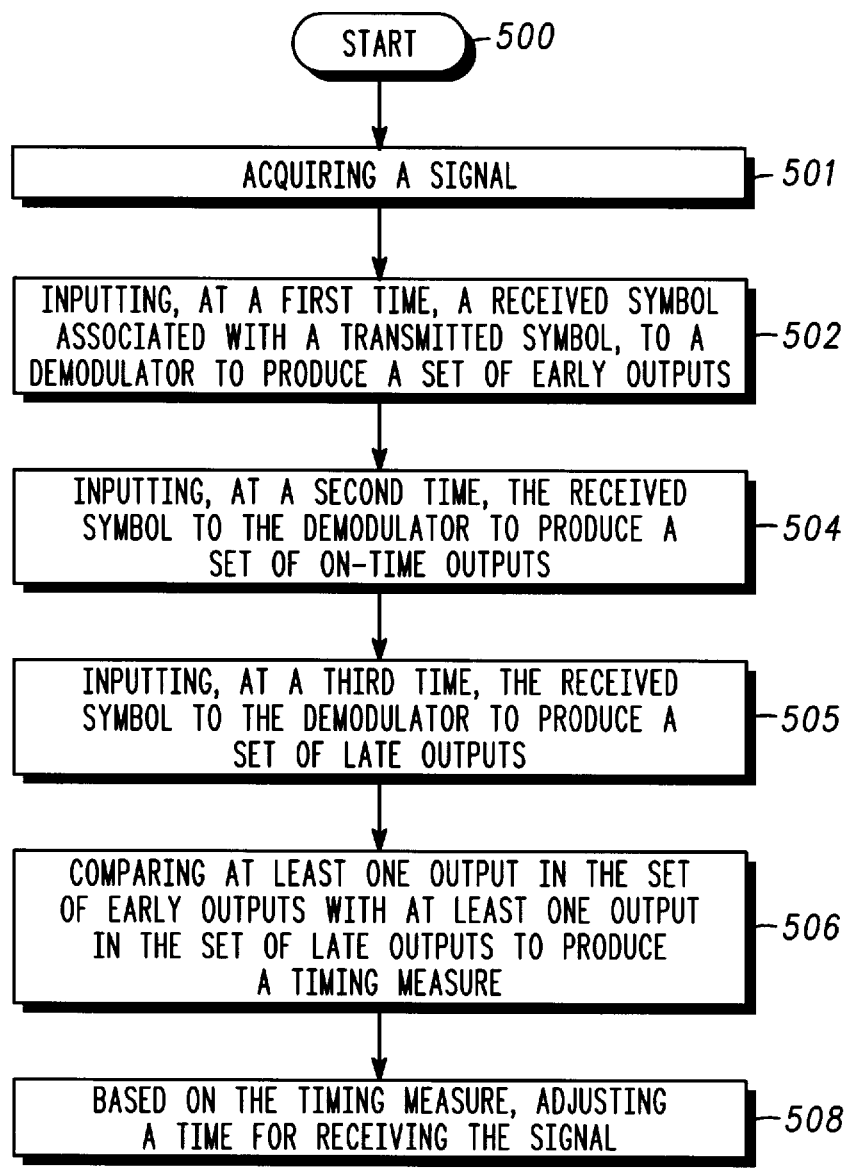
FIG. 6 is a flowchart of a method for receiving the communication signal waveform generated by the transmitter depicted in FIG. 2, according to a preferred embodiment of the present invention.

One preferred embodiment of a method for receiving a signal in a digital radio frequency communication system is outlined in the flowchart of FIG. 6. The method starts at block 500, and continues to block 502, where a first step includes inputting, at a first time, a received symbol associated with a transmitted symbol to a demodulator to produce a set of early outputs. The next step, at block 504, includes inputting, at a second time, the received symbol to the demodulator to produce a set of on-time outputs. The step of inputting, at a third time, the received symbol to the demodulator to produce a set of late outputs is shown at block 505. The step at block 506 entails comparing at least one output in the set of early outputs with at least one output in the set of late outputs to produce a timing measure. Finally, at block 508, a time for receiving the signal is adjusted based on the timing measure.

In a second embodiment, the timing measure, which may be included in a set of timing measures, is stored in a memory. Next, a predetermined number of outputs in the set of on-time outputs are input to an estimator which produces the transmitted symbol. Based on the transmitted symbol, the timing measure is selected from the memory. Then, based on the selection, the time for receiving the signal is adjusted.

Although receiver 60 has been described herein in terms of specific logical/functional circuitry and relationships, it is contemplated that receiver 60 may be configured in a variety of ways, such as with programmed processors or application-specific integrated circuits (ASICs). It should also be understood that when one element is responsive to another element, the elements may be directly or indirectly coupled.

It is contemplated that intermediate decisions regarding demodulated signal 81, made within decoder block 76, may be utilized. In addition, demodulated signal 81 may be re-modulated using, for example, a circuit such as the circuit depicted in FIG. 2, to generate spreading sequences. In this manner, FHT resources may be conserved, and the timing measures may include more bits.

The IS-95 reverse link channel has been specifically referred to herein, but the present invention is applicable to any digital channel, including but not limited to the forward-link IS-95 channel and to all forward- and reverse-link TDMA channels, in all TDMA systems, such as Groupe Special Mobile (GSM), a European TDMA system, Pacific Digital Cellular (PDC), a Japanese TDMA system, and Interim Standard 54 (IS-54), a U.S. TDMA system.

The principles of the present invention which apply to cellular-based digital communication systems may also apply to other types of communication systems, including but not limited to personal communication systems, trunked systems, satellite communication systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other and further forms of the invention, and embodiments other than the specific embodiments described above, may be devised without departing from the spirit and scope of the appended claims and their equivalents, and therefore it is intended that the scope of this invention will only be governed by the following claims and their equivalents.

We claim:

1. A method for receiving a signal in a digital radio frequency communication system, the signal comprising a plurality of received symbols associated with a plurality of transmitted symbols, the method comprising the steps of:

inputting, at a first time, a received symbol of the plurality of received symbols associated with a transmitted symbol of the plurality of transmitted symbols to a demodulator having a plurality of outputs to produce a set of early outputs;

inputting, at a second time, the received symbol to the demodulator to produce a set of on-time outputs;

inputting, at a third time, the received symbol to the demodulator to produce a set of late outputs;

comparing a predetermined number of outputs in the set of early outputs with a predetermined number of outputs in the set of late outputs to produce a set of timing measures;

storing the set of timing measures in a memory;

inputting a predetermined number of outputs in the set of on-time outputs to an estimator, the estimator outputting an estimate of the transmitted symbol;

based on the estimate of the transmitted symbol, selecting a timing measure from the set of timing measures in the memory; and based on the selection, adjusting a time for receiving the signal.

2. The method according to claim 1, wherein the received symbol comprises a power control group.

3. The method according to claim 2, wherein the power control group comprises six Walsh codes.

4. The method according to claim 1, wherein the estimator comprises a maximum likelihood sequence estimator.

5. The method according to claim 1, wherein each of the plurality of outputs of the demodulator comprises an energy value.

6. The method according to claim 5, wherein each of the timing measures of the set of timing measures comprises a sign of a difference between one of the energy values in the set of late outputs and one of the energy values in the set of early outputs.

7. The method according to claim 1, wherein the memory comprises a random access memory.

* * * * *